(12) United States Patent
Nungester et al.

(10) Patent No.: US 8,842,096 B2
(45) Date of Patent: Sep. 23, 2014

(54) INTERACTIVE PROJECTION SYSTEM

(75) Inventors: Gregory R. Nungester, Asbury, NJ (US); Stephen Weiss, Easton, PA (US)

(73) Assignee: Crayola LLC, Easton, PA (US)

( * ) Notice: Subject to any disclaimer, the term of this patent is extended or adjusted under 35 U.S.C. 154(b) by 413 days.

(21) Appl. No.: 12/986,298

(22) Filed: Jan. 7, 2011

(65) Prior Publication Data

US 2011/0169778 A1 Jul. 14, 2011

Related U.S. Application Data

(60) Provisional application No. 61/293,280, filed on Jan. 8, 2010.

(51) Int. Cl.
*G06F 3/042* (2006.01)
*G06F 3/033* (2013.01)
*G06F 3/041* (2006.01)
*G06F 3/0354* (2013.01)

(52) U.S. Cl.
CPC ............ *G06F 3/0425* (2013.01); *G06F 3/0418* (2013.01); *G06F 3/03542* (2013.01)
USPC .......................................... 345/175; 345/179

(58) Field of Classification Search
USPC ................. 345/173, 175, 179, 158, 169, 207; 353/42, 46–51, 122; 178/18.09, 19.05
See application file for complete search history.

(56) References Cited

U.S. PATENT DOCUMENTS

| | | | |
|---|---|---|---|
| 5,235,363 A * | 8/1993 | Vogeley et al. | 353/122 |
| 5,239,373 A | 8/1993 | Tang et al. | |
| 5,646,650 A | 7/1997 | Miller et al. | |
| 6,100,538 A * | 8/2000 | Ogawa | 250/559.29 |
| 6,377,249 B1 | 4/2002 | Mumford | |
| 6,707,444 B1 | 3/2004 | Hendriks et al. | |
| 6,766,066 B2 * | 7/2004 | Kitazawa | 382/291 |
| 6,795,068 B1 | 9/2004 | Marks | |
| 6,802,611 B2 | 10/2004 | Chu et al. | |
| 6,917,033 B2 | 7/2005 | Hendriks et al. | |
| 7,136,053 B2 | 11/2006 | Hendriks et al. | |
| 7,219,233 B1 * | 5/2007 | Hendriks et al. | 713/182 |
| 7,355,584 B2 | 4/2008 | Hendriks et al. | |
| 7,410,260 B2 | 8/2008 | Mehrl | |

(Continued)

OTHER PUBLICATIONS

SpiralScratch, EyeControls Algorithm Description v1.0, May 16, 2007, 3 pages.

(Continued)

*Primary Examiner* — Hong Zhou
(74) *Attorney, Agent, or Firm* — Shook, Hardy & Bacon L.L.P.

(57) ABSTRACT

An interactive projection system, apparatus, and methods for their use are provided. The system includes a projection unit that projects an image of a user interface onto a projection surface. At least one vision sensor is provided that is configured to sense a location of an infrared light source. A computing device that is configured to execute applications to provide the user interface and to determine corresponding outputs based on inputs received by the vision sensor is also provided. An infrared input device, or stylus, is employed by a user to provide infrared light inputs at desired locations with respect to the projected user interface. Additionally, a plurality of styli, each emitting a different respective wavelength of infrared light is also useable to provide multiple simultaneous inputs to the system. An equal plurality of vision sensors may also be employed to separately sense inputs from a respective stylus.

17 Claims, 9 Drawing Sheets

(56) References Cited

U.S. PATENT DOCUMENTS

| | | | |
|---|---|---|---|
| 7,432,917 B2 | 10/2008 | Wilson et al. | |
| 7,626,578 B2 | 12/2009 | Wilson et al. | |
| 8,305,344 B2* | 11/2012 | Tamura | 345/158 |
| 2002/0015137 A1* | 2/2002 | Hasegawa | 353/42 |
| 2004/0069934 A1 | 4/2004 | Hendriks | |
| 2005/0134697 A1* | 6/2005 | Mikkonen et al. | 348/216.1 |
| 2005/0184967 A1* | 8/2005 | Yoshida et al. | 345/173 |
| 2006/0188849 A1 | 8/2006 | Shamaie | |
| 2006/0287087 A1 | 12/2006 | Zalewski et al. | |
| 2006/0291014 A1* | 12/2006 | Hirata et al. | 358/504 |
| 2007/0050597 A1 | 3/2007 | Ikeda | |
| 2007/0188445 A1* | 8/2007 | Silverstein et al. | 345/156 |
| 2007/0211027 A1 | 9/2007 | Ohta | |
| 2007/0218994 A1 | 9/2007 | Goto et al. | |
| 2008/0169132 A1 | 7/2008 | Ding et al. | |
| 2008/0259030 A1 | 10/2008 | Holtzman et al. | |
| 2009/0002344 A1 | 1/2009 | Wilson et al. | |

OTHER PUBLICATIONS

Johnny Chung Lee, Projects, Wii, Jan. 6, 2011, http://johnnylee.net/projects/wii/ 2 pages.

PlayStation Eye from Wikipedia, Jan. 6, 2011, http://en.wikipedia.org/wiki/PlayStation Eye, 6 pages.

Wiimote Project, Jan. 6, 2011, http://www.wiimoteproject.com/ 2 pages.

WiiTeachers.com, Jan. 6, 2011, http://wiiteachers.com, 11 pages.

* cited by examiner

US 8,842,096 B2

INTERACTIVE PROJECTION SYSTEM

CROSS-REFERENCE TO RELATED APPLICATIONS

This application claims priority to U.S. Provisional Patent Application No. 61/293,280, filed Jan. 8, 2010, the disclosure of which is hereby incorporated herein by reference in its entirety.

SUMMARY

A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In an embodiment of the invention, an interactive projection system is described. In an embodiment, the projection system includes a projection unit, a vision sensor, and a computing device. The computing device employs the projection unit to project and display a user interface on a projection surface such as a wall or projection screen. The vision sensor is directed toward the projected user interface and is calibrated thereto. The vision sensor is configured to track an infrared light source manipulated by a user with respect to the projected user interface. The infrared light source includes a pen-like device, or stylus, with a user actuated infrared light source disposed at one end. As such, the user manipulates the infrared light source with respect to the projected user interface. The vision sensor tracks the light source's movements and the computing device interprets the movements as inputs to a computer program associated with the projected user interface. The computing device then determines and displays, via the projection unit, outputs to the user interface corresponding to the user's inputs.

DESCRIPTION OF THE DRAWINGS

Illustrative embodiments of the invention are described in detail below with reference to the attached drawing figures, and wherein.

DETAILED DESCRIPTION

Figure 1:
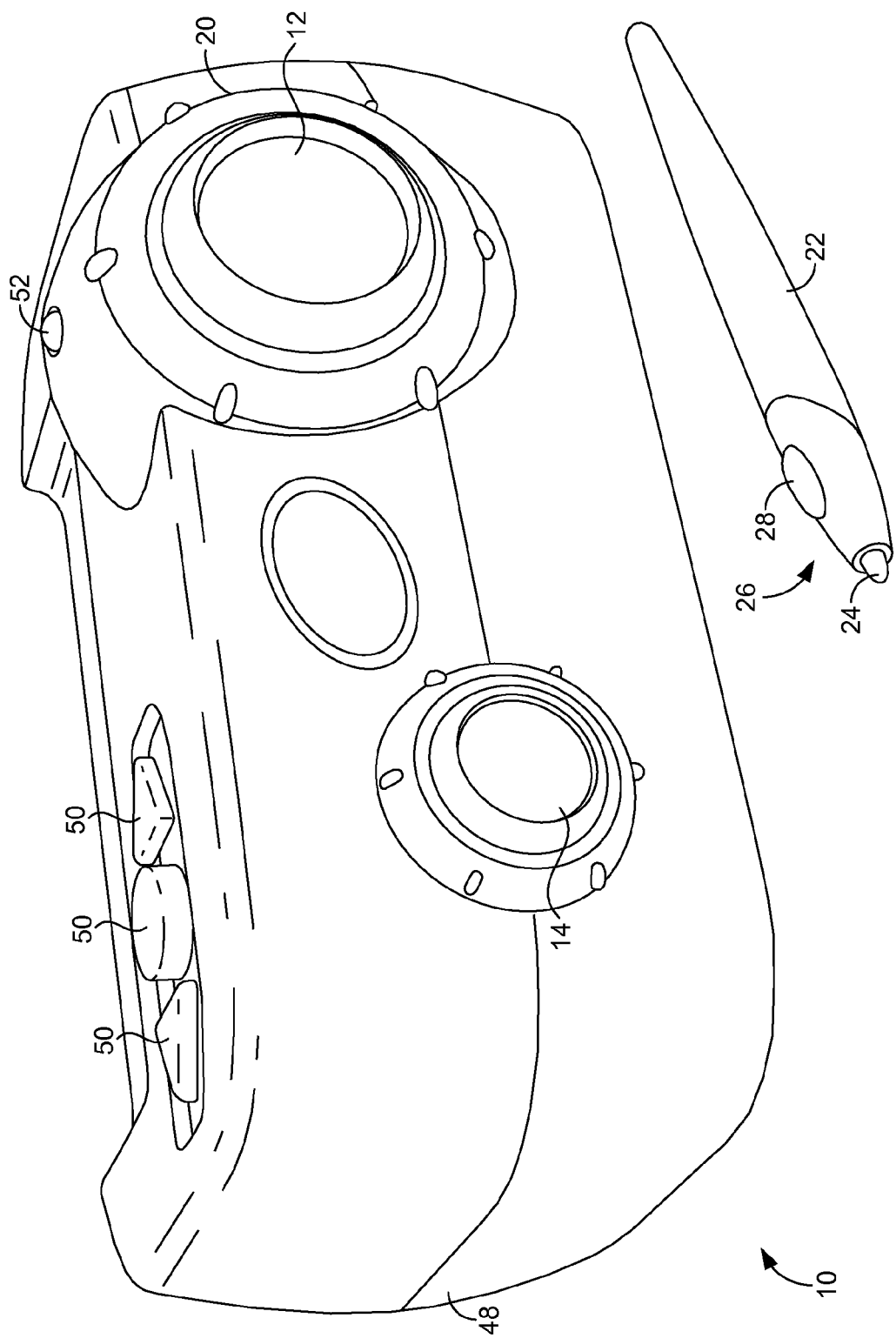
FIG. 1 is perspective drawing depicting an interactive projection system in accordance with an embodiment of the invention.

The subject matter of embodiments of the invention is described with specificity herein to meet statutory requirements. But the description itself is not intended to necessarily limit the scope of claims. Rather, the claimed subject matter might be embodied in other ways to include different steps, components, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention include interactive projection systems, apparatus, and methods for their use. In an embodiment, an interactive projection system is described. The interactive projection system includes a projection unit, a vision sensor, a computing device, and an infrared input device. The projection unit projects at least one image onto a projection surface. The vision sensor is configured to sense the location of an infrared light source. The computing device executes a computer application that provides a user interface image that is projected by the projection unit onto the projection surface. And the infrared input device is configured to emit an infrared light upon activation by a user; the infrared light provides input to the computing device via the vision sensor. The computing device identifies a location of the infrared light with respect to the user interface image projected onto the projection surface and provides a corresponding output.

In another embodiment, a method for using a projected user interface is described. A projection system is provided that includes a housing having disposed therein a projection unit that projects at least one image onto a projection surface, a vision sensor capable of sensing a location of an infrared light source, and a computing device that executes a software application that provides a user interface image. The user interface image is projected onto a surface via the projection unit. An infrared input device is provided that is configured to provide an infrared input signal. The infrared input signal is received from the input device via the vision sensor. A location of the infrared input signal with respect to the projected user interface image is determined. An input command to the software application is determined based on the determined location of the infrared input signal. The user interface image is updated based on the input command. An updated user interface image is projected.

In another embodiment, an interactive projection unit is described. The interactive projection unit includes a projection unit that projects at least one image onto a projection surface. The unit also includes a first vision sensor configured to sense the location of a first infrared light source. The first vision sensor includes a first complementary metal-oxide-semiconductor (CMOS) sensor and a light filter that allows only a first predetermined range of wavelengths of infrared light to reach the CMOS sensor. A second vision sensor is also provided that is configured to sense the location of a second infrared light source; the second vision sensor includes a second CMOS sensor and a second light filter that allows only a second predetermined range of wavelengths of infrared light to reach the second CMOS sensor. A computing device having a processor and a memory configured to execute one or more applications that provide a user interface image that is projected by the projection unit onto the projection surface is also included. Additionally, the unit includes a first infrared input device that is configured to provide a first input to the computing device by emitting infrared light of a first wavelength within the first predetermined range that is received by the first vision sensor and a second infrared input device that is configured to provide a second input to the computing device by emitting infrared light of a second wavelength within the second predetermined range that is received by the second vision sensor.

Figure 2:
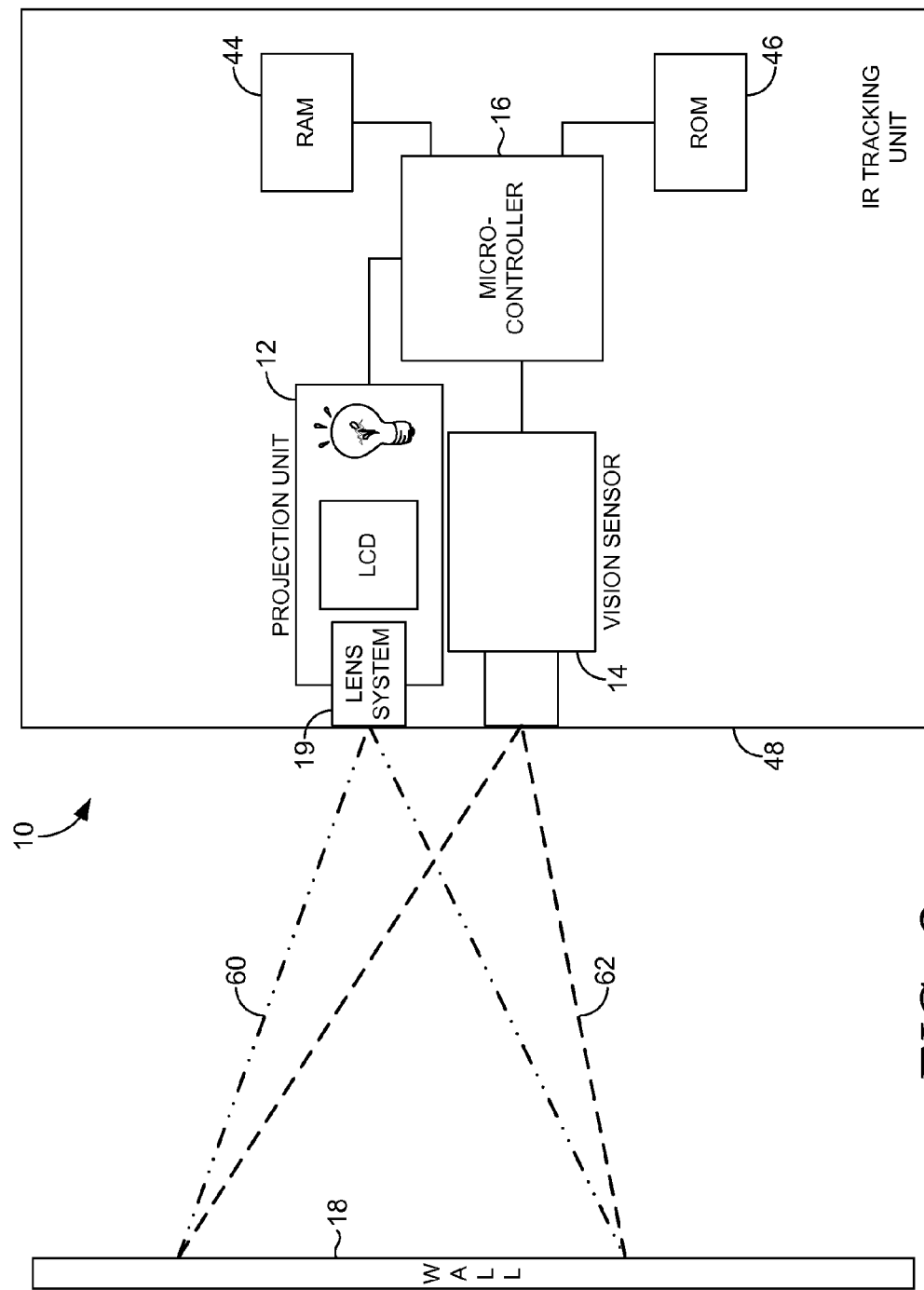
FIG. 2 is a schematic diagram depicting an interactive projection system in accordance with an embodiment of the invention.
Figure 3:
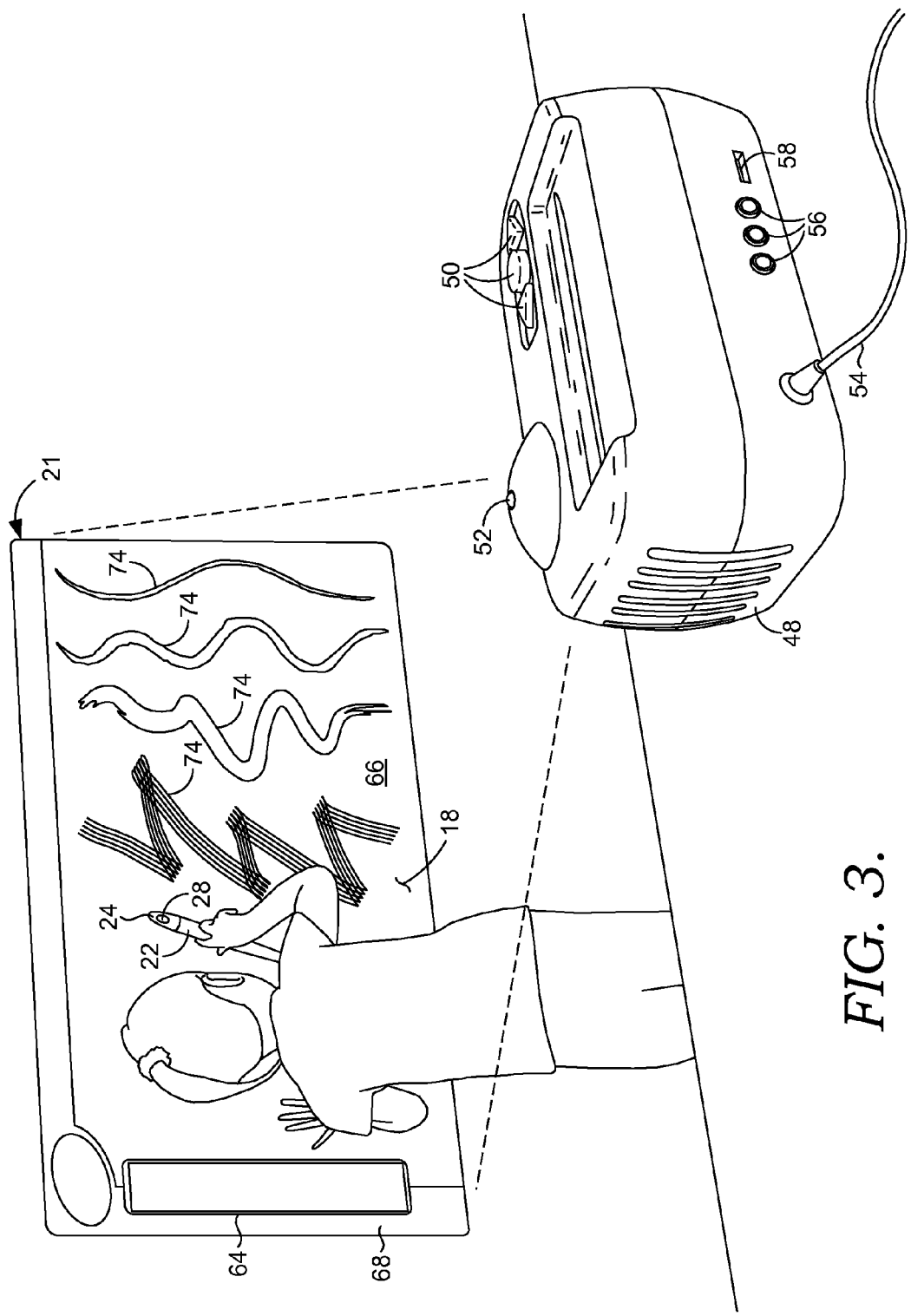
FIG. 3 is a perspective drawing depicting a user interacting with a projected user interface of an interactive projection system in accordance with an embodiment of the invention.

With reference now to the drawings, an interactive projection system 10 is described in accordance with embodiments of the invention. As depicted in FIGS. 1-3, the projection system 10 includes a projection unit 12, a vision sensor 14, and a computing device 16. The projection unit 12 includes any projection system available in the art useable to project an image or video (hereinafter referred to as an image(s)) onto a projection surface 18. The projection unit 12 is configured to project images in color, black-and-white, and other color schemes. In an embodiment, the projection unit 12 has a native resolution of at least 640×480 pixels and a color depth of at least 16 bits. The projection unit 12 is also capable of projecting an image onto the projection surface 18. In an embodiment, the projection surface 18 is at least four feet away from the projection unit 12. In another embodiment, the projection unit provides a luminous flux of greater than 12 lumens. The projection surface 18 includes any available surface on which an image can be projected, such as for example, and not limitation, a wall, or a projection screen.

The projection unit 12 may include one or more lenses 19 for focusing and/or adjusting a projected image 21. As depicted in FIG. 1, a collar 20 may be included to allow a user to manually focus the projected image 21.

The vision sensor 14 is any available IR light sensor available in the art that is useable to detect the presence and location of an IR light source. In an embodiment, the vision sensor 14 comprises a complementary metal-oxide-semiconductor (CMOS) sensor that is sensitive to light in the IR portion of the spectrum, e.g., light having a wavelength between approximately 0.7 and 300 micrometers. In another embodiment, the vision sensor 14 has a resolution of at least 640×480 pixels and a refresh rate of at least 30 frames per second. One or more lenses or filters may be employed to focus the incident light on the vision sensor 14 and to filter out unwanted wavelengths of light, such as that in the visible portion of the spectrum. In an embodiment, a visible light filter is employed such that generally only light in the IR spectrum reaches the vision sensor 14.

An IR input device or stylus 22 is also included in the projection system 10. The stylus 22 is configured similarly to a pen or other marking apparatus, but may be configured in any desired manner. The stylus 22 includes an IR emitting light source 24 located at a first end 26. In another embodiment, the light source 24 is located at any point along the stylus 22 and/or more than one IR light source 24 is employed. The stylus 22 also includes a trigger 28 comprising a button or switch that is useable to turn the IR light source 24 on or off. Interior to the stylus 22 are one or more batteries and electronic components (not shown) for supplying power to the light source 24 when the trigger 28 is actuated to an ON position. In another embodiment, power is supplied to the stylus 24 via a power cord (not shown) extending therefrom and connecting to an electrical power source.

The computing device 16 comprises any available computing device known in the art that is suitable for implementing embodiments of the present invention. The computing device 16 includes or is in electrical communication with one or memories, such as for example, a random-access memory (RAM) 44 and a read-only memory (ROM) 46, as well as the projection unit 12 and the vision sensor 14. As such, the computing device 16 receives data regarding the position of the IR light source 24 of the stylus 22 from the vision sensor 14 and provides an image to the projection unit 12 to be displayed.

Figure 4:
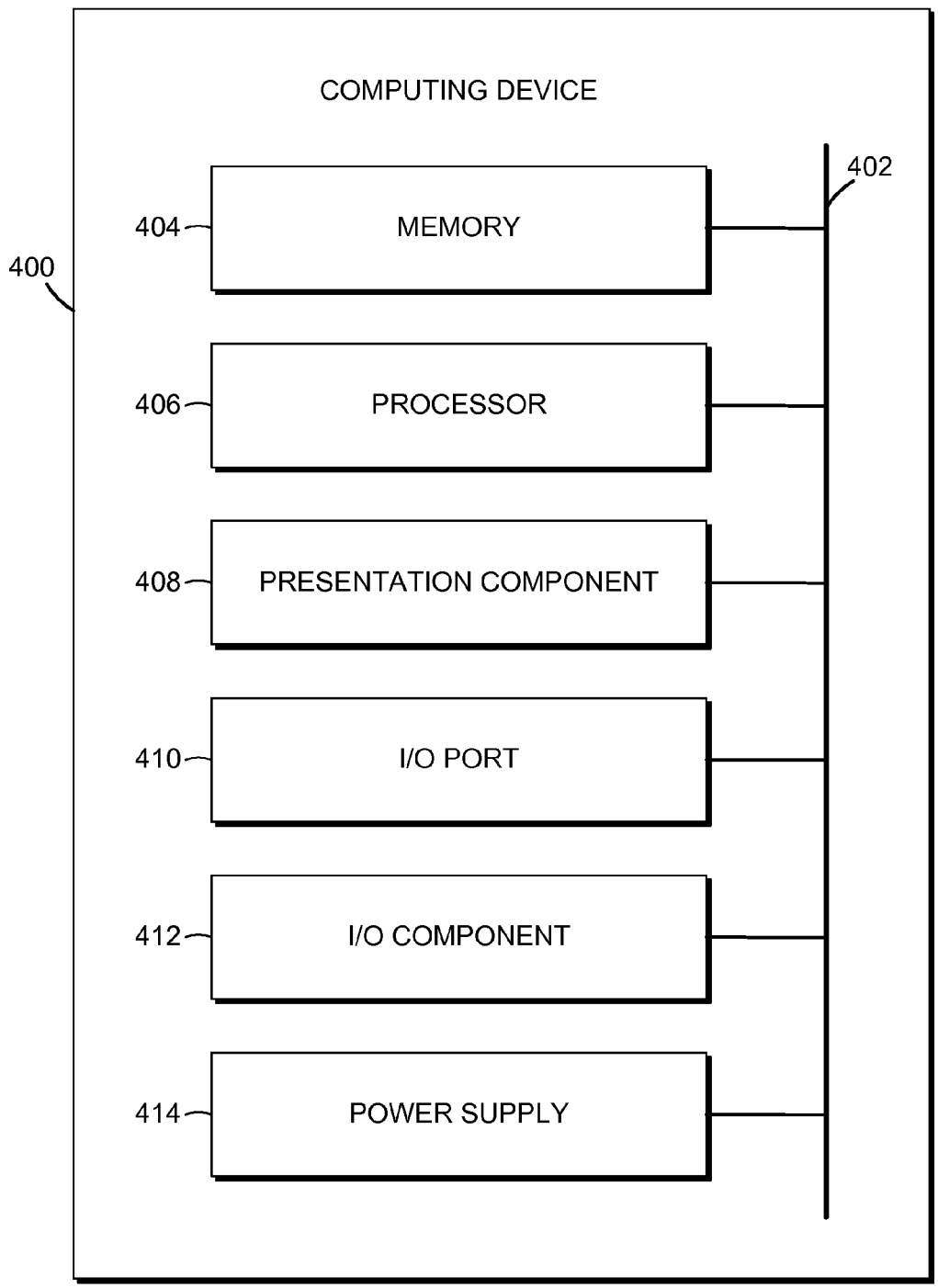
FIG. 4 is a block diagram depicting an exemplary computing device suitable for use in embodiments of the invention.

With reference now to FIG. 4, an exemplary computing device 400 is described in accordance with an embodiment of the invention. The computing device 400 is but one example of a suitable computing device and is not intended to suggest any limitation as to the scope of use or functionality of invention embodiments. Neither should the computing device 400 be interpreted as having any dependency or requirement relating to any one or combination of components illustrated.

Embodiments of the invention may include computer code or machine-useable instructions, including computer-executable instructions such as program modules, being executed by a computer or other machine. Generally, program modules including routines, programs, objects, components, data structures, etc., refer to code that perform particular tasks or implement particular abstract data types.

As depicted in FIG. 4, the computing device 400 includes a bus 402 that directly or indirectly couples one or more of a memory 404, a processor 406, a presentation component 408 (such as the projection unit 12), input/output ports 410, input/output components 412 (such as the vision sensor 14), and an illustrative power supply 414.

The computing device 400 typically includes a variety of volatile and non-volatile computer-readable media. Computer-readable media comprise non-transitory forms of computer-storage media such as, for example and not limitation, Random Access Memory (RAM); Read-Only Memory (ROM); Electronically Erasable Programmable Read-Only Memory (EEPROM); flash memory or other memory technologies; compact disc read-only memory (CDROM), digital versatile disks (DVD) or other optical media; magnetic cassettes, magnetic tape, magnetic disk storage or other magnetic storage devices, or any other medium that can be used to encode desired information and be accessed by computing device 400. Additionally, in an embodiment, removable computer-readable media such as a universal serial bus (USB) flash drive, a Secure Digital (SD) memory card, a CompactFlash memory card, a Memory Stick, and an xD memory card are provided.

The I/O ports 410 allow the computing device 400 to be logically coupled to other devices including the I/O components 412, some of which may be built in. Illustrative components include a microphone, audio system, joystick, game pad, scanner, printer, wireless device, or the like.

With reference again to FIGS. 1-3, components of the projection system 10 are provided within a housing 48. The housing 48 is configured in any desired manner and may include one or more buttons 50 for interacting directly with the projection system 10. For example, the buttons 50 might allow a user to turn the projection system 10 on and/or to navigate through one or more menus. The housing 48 also includes a power indicator light 52, one or more I/O terminals 56, and a memory device port 58. The I/O terminals 56 allow a user to connect one or more additional devices to the projection system 10 such as for example, and not limitation, a display device, a computing device, and an audio component. The memory device port 58 allows a user to insert a removable memory device (not shown) such as, for example, and not limitation, a USB flash drive, an SD memory card, a CompactFlash memory card, a Memory Stick, or an xD memory card to allow reading or writing data to the memory device.

As depicted best in FIG. 1, the projection unit 12 and the vision sensor 14 are both located along a single side of the housing 48 and generally in the same level plane. In an embodiment, a viewable area 60 of the projection unit 12 and a viewable area 62 of the vision sensor 14 are nearly the same such that the projected image 21 projected by the projection unit 12 takes up a majority of the viewable area of the vision sensor 14. Such an orientation may decrease the divergence of the projection unit 12 and the vision sensor 14 when a projection surface is not at an optimal distance from the projection system 10.

Figure 5:
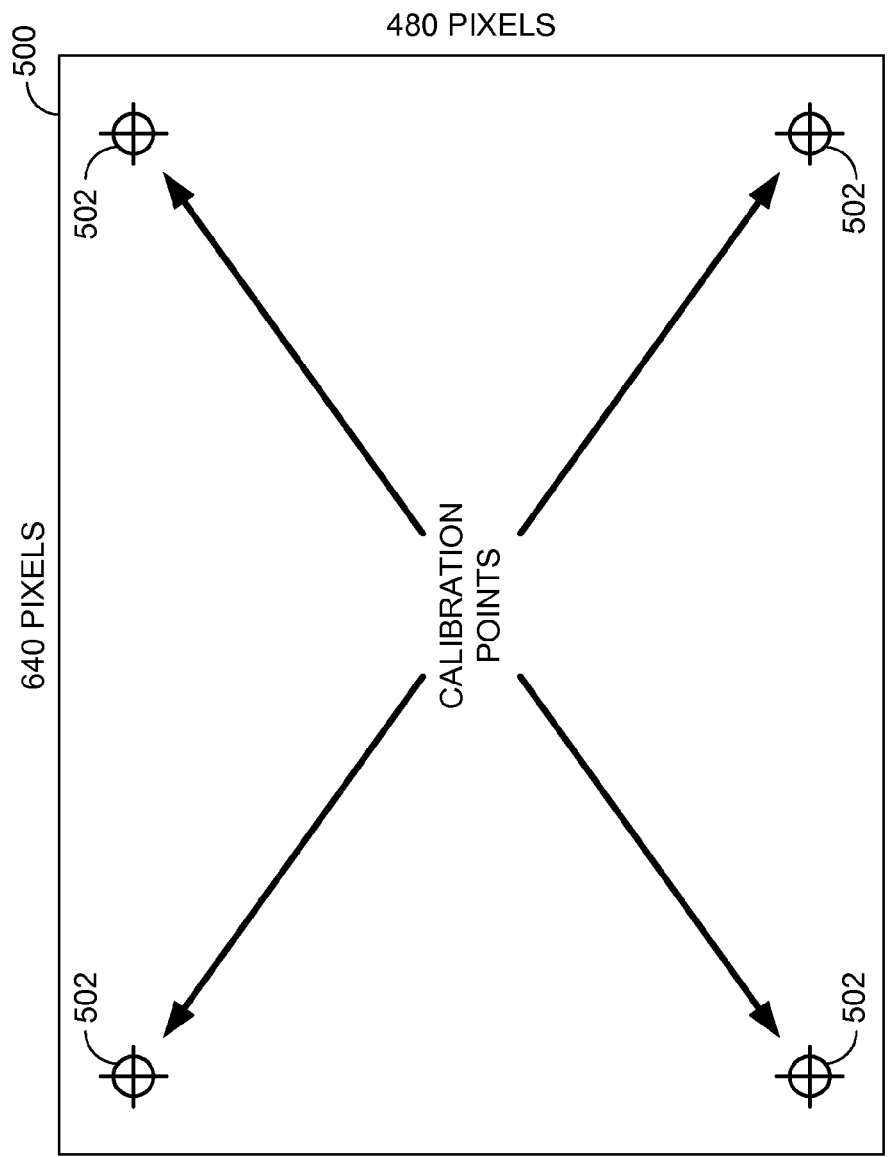
FIG. 5 is a diagram depicting a calibration screen suitable for use in calibrating an interactive projection system in accordance with an embodiment of the invention.

In operation, the projection system 10 provides a projected, interactive user interface. Initially, or at any time during use, the vision sensor 14 is calibrated to the projection unit 12. Such may be required as an initial setup of the projection system 10 and when the distance and/or orientation of the projection system 10 with respect to the projection surface 18 are changed. To calibrate the projection system 10, the computing device 16 projects a calibration image 500 onto the projection surface 18 as depicted in FIG. 5. The calibration image 500 includes one or more calibration points 502 located at various locations within the calibration image 500. The calibration image 500 is one exemplary calibration image, of which there may be many, and is not intended to limit the scope of embodiments of the invention to any particular calibration image.

Using the stylus 22, the user provides an input at each of the calibration points 502. The inputs are provided by placing the first end 26 of the stylus 22 on or near a calibration point 502 and depressing the trigger 28 to illuminate the IR light source 24. Although, the user may not perceive any visible light emitting from the IR light source 24, the vision sensor 14 senses the IR light and identifies a location of the IR light source 24. Upon receiving such an input at each of the calibration points 502, the computing device 16 internally maps the coordinates of the inputs to the projected image using one or more algorithms to thereby align the projection unit's output with the vision sensor's input.

Figure 6:
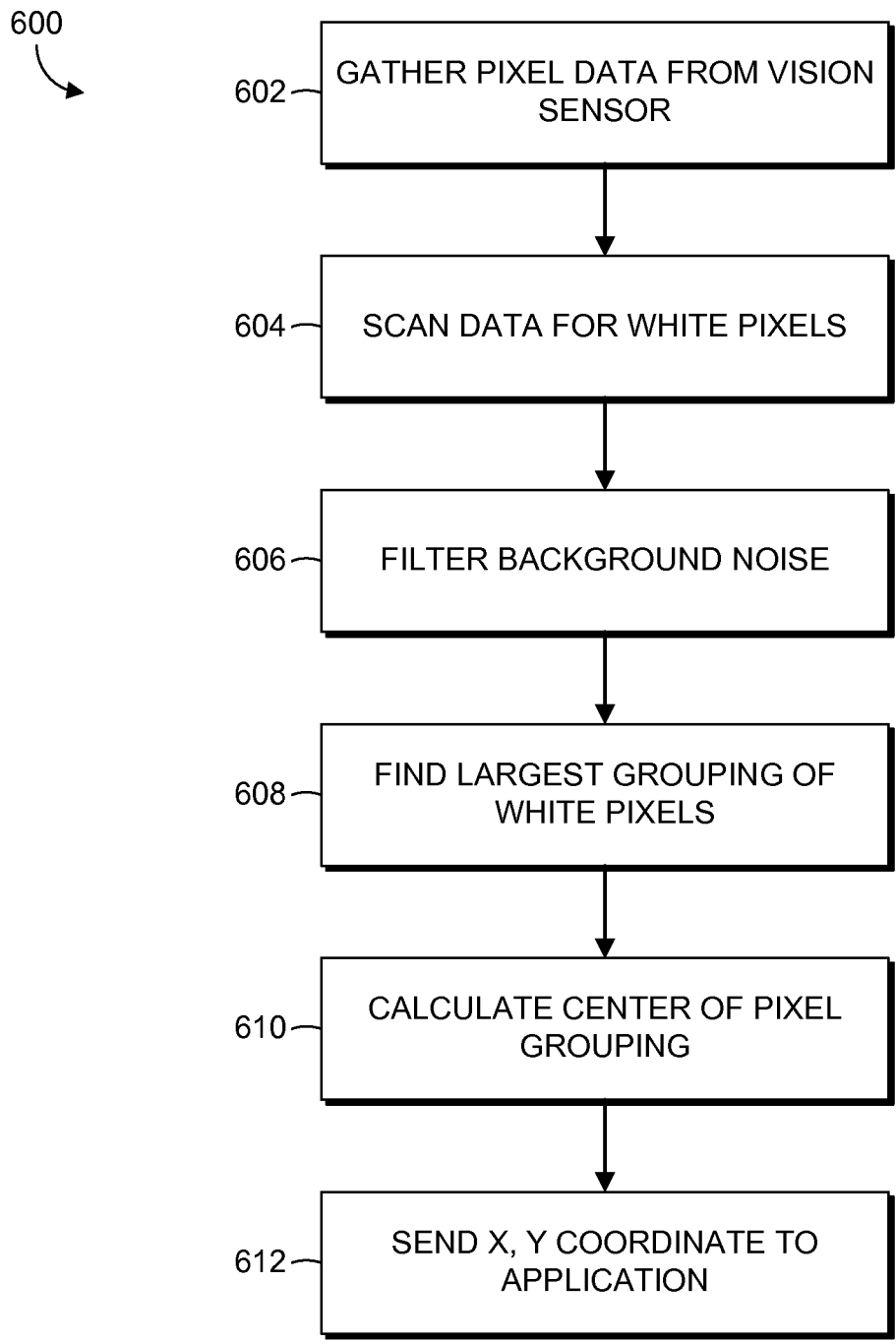
FIG. 6 is a flow diagram depicting a method for processing data collected by the vision system of an interactive projection system in accordance with an embodiment of the invention.

In an embodiment, the computing device 16 identifies the location of the IR light source 24 by a method 600 depicted in FIG. 6. At a step 602, pixel data is gathered from the visual sensor 14. The pixel data is scanned to identify pixels indicating received IR light from the IR light source 24, as indicated at a step 604 and depicted in FIG. 7. In an embodiment, the vision sensor 14 includes a visible light filter and/or an infrared light filter that allows only light of a desired wavelength or range of wavelengths to pass therethrough. The pixel data may include a collection of black pixels 700 and white pixels 702; black pixels 700 representative of no IR light received and white pixels 702 representative of received IR light and/or noise. At a step 606, the pixel data is filtered to remove background noise, by one or more methods known in the art.

Figure 7:
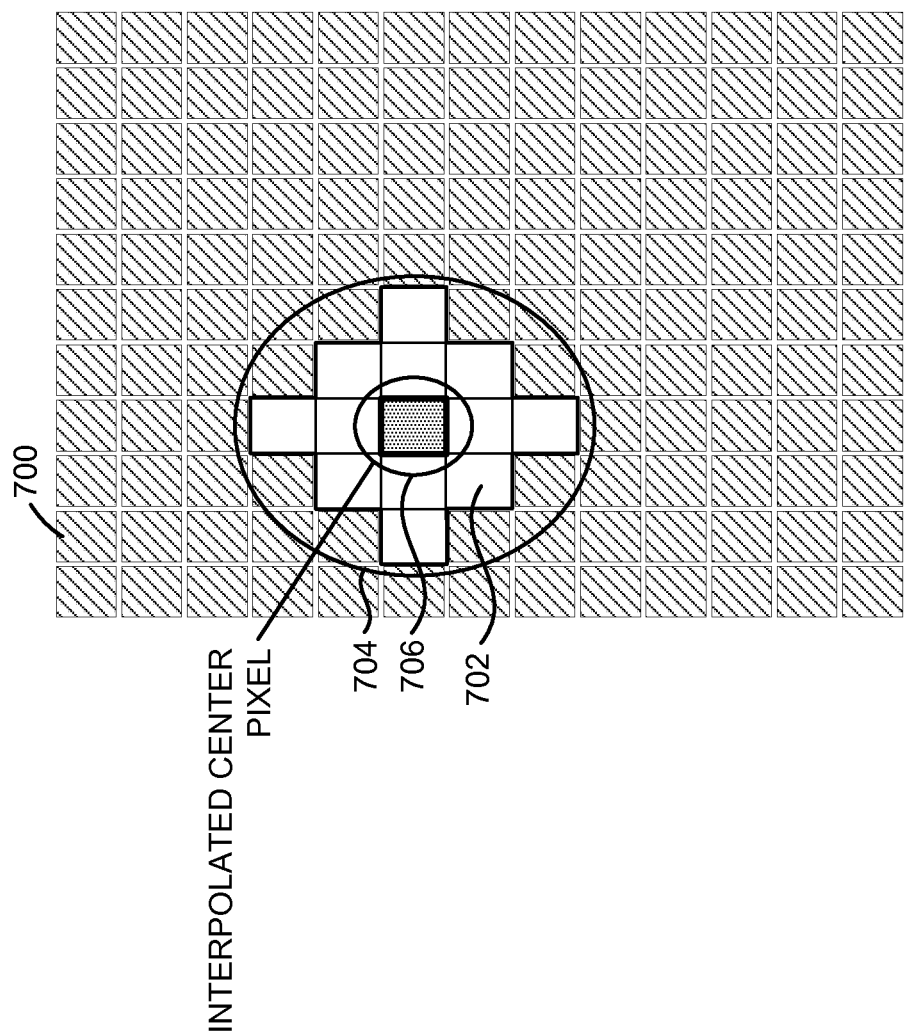
FIG. 7 is an illustrative drawing depicting the interpretation of data collected by the vision system of an interactive projection system in accordance with an embodiment of the invention.

At a step 608, the largest grouping of white pixels 704 represented in the pixel data is identified as depicted in FIG. 7. As the size of the largest grouping of white pixels 704 may change as a function of the distance of the IR light source 24 from the vision sensor 14 (e.g., closer IR light sources 24 will provide a larger grouping while more distant IR light sources 24 will provide a smaller grouping) the center of the pixel grouping 706 is calculated, as indicated at a step 610 and depicted at 706 in FIG. 7. The coordinates of the center 706 are identified according to any desired coordinate system, such as for example, and not limitation, X and Y coordinates on a Cartesian coordinate plane and the coordinates are provided to an application being executed by the computing device 16, as indicated at a step 612.

In continued operation, the computing device 16 executes an application, such as for example a drawing application that allows a user to select various virtual drawing apparatus, styles, colors, and the like, from a tool bar 64 and to draw on a virtual canvas 66. Via the projection unit 12, the computing device 16 projects an image of a user interface 68 for the drawing application onto a wall serving as the projection surface 18. Similarly, to that described above with respect to calibration, the user provides inputs to the drawing application by depressing the trigger 28 to emit IR light that is sensed by the vision sensor 14.

The inputs include point or click inputs in which the IR light is merely flashed similarly to a click input from a mouse as generally known in the art. The inputs also include stroke inputs in which the user depresses the trigger 28 and provides a movement of the stylus 22 while the trigger 28 remains depressed. Such a stroke input might be used to generate brush strokes 74 as depicted in FIG. 3. A variety of additional input types are known in the art and can be similarly employed in embodiments of the invention. In an embodiment, more than one stylus 22 is used to provide multiple inputs to the computer application.

As such, a user is provided with an interactive, projected user interface 68 that provides an enjoyable creative and learning experience. The interactive inputs of the user through the use of the stylus 22 mimic those often used for interacting with a computer application and as such are easy to learn and use. Further, in another embodiment, the projection system 10 functions as video or image projector for watching videos, slideshows, and the like and the stylus 22 is useable to provide inputs to control the projection of such videos, slideshows, or other presentations. In an embodiment, the projection system 10 also includes one or more speakers and associated components for providing audible sounds and outputs.

Figure 8:
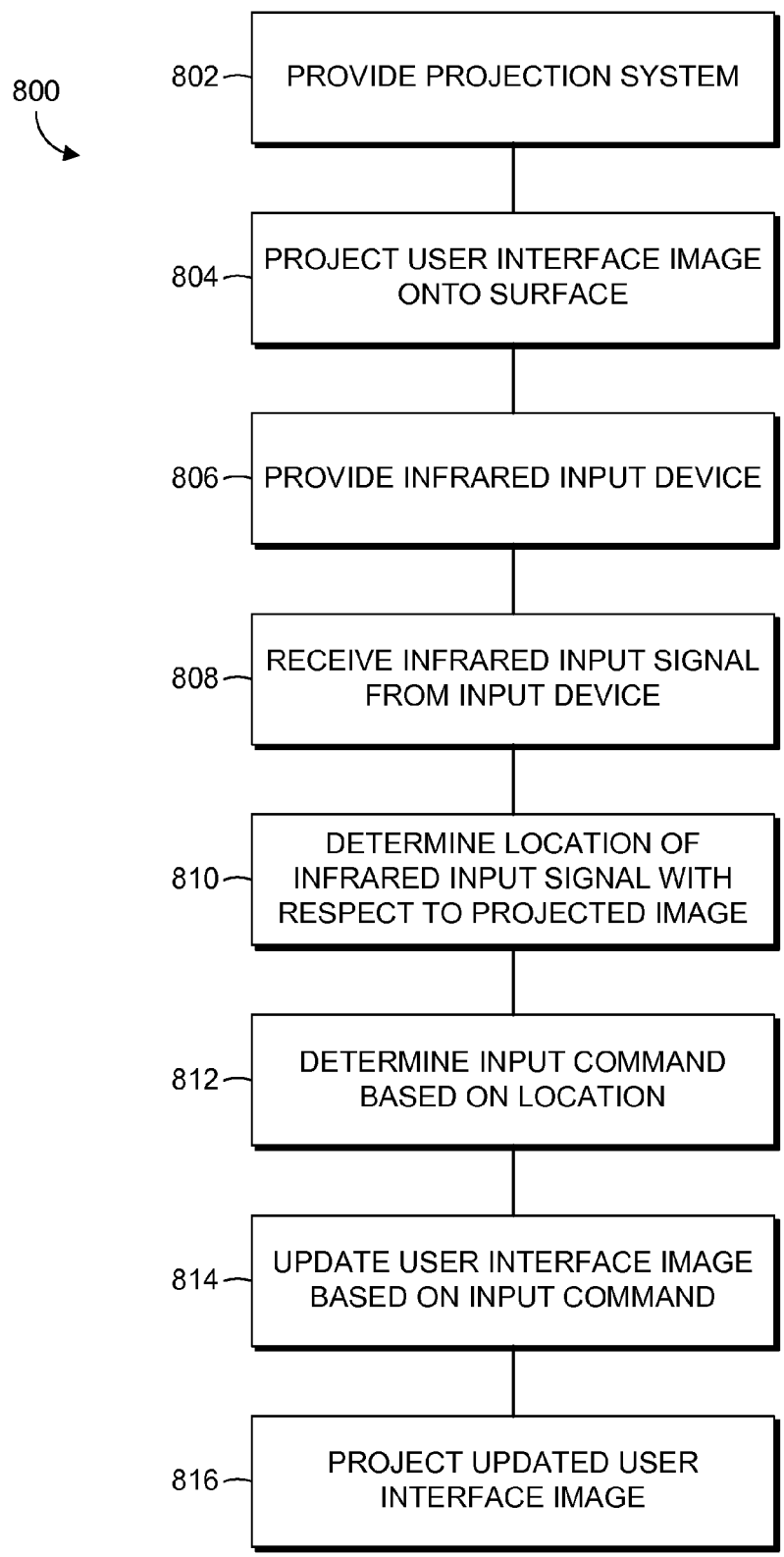
FIG. 8 is a flow diagram depicting a method for using a projected user interface in accordance with an embodiment of the invention.

With reference now to FIG. 8, a method 800 for using a projected user interface is described in accordance with an embodiment of the invention. At a step 802, a projection system, such as the projection system 10, including a projection unit, a vision sensor, a computing unit is provided. The projection system executes a software application that provides a user interface and an image of the user interface is projected by the projection system, as indicated at a step 804. The image may be projected onto a wall, a projection screen, or any other suitable surface.

An IR input device, such as the stylus 22, is provided at a step 806. At a step 808, IR input signal or signals are received from the IR input device by the vision sensor of the projection system. The IR input signal(s) may be a click input having a short duration (e.g. less that approximately one second) and a generally static location or the input signal(s) might be a drag input having a longer duration and moving from one location to another, among other potential inputs types.

At a step 810, a location of the IR input signal with respect to the projected user interface image is determined. In an embodiment, the vision sensor samples the IR light that is incident on the sensor at a given rate. The location of the IR input signal can be determined for each sampling. Thereby, click inputs and drag input can be differentiated based on the number of samples in which they are identified and based on whether the location of the input changes from one sample to the next. One of skill in the art will recognize additional ways of identifying and differentiating input signals, all of which are within the scope of embodiments of the invention and are useable therewith.

At a step 812, an input command is determined based on the location and/or the type of IR input signal received. For example, a click input might be received in a location associated with a selectable button in the projected user interface image, or a drag input might be received over a canvas portion of a user interface for a drawing program. At a step 814, the user interface image is updated based on the input command. Continuing the above examples, the user interface image might be updated to depict a button as being depressed and a subsequent window displayed or, a brush stroke of a virtual paintbrush in a drawing program might be displayed with respect to the drag input. The updated user interface image is then projected, as indicated at a step 816.

Figure 9:
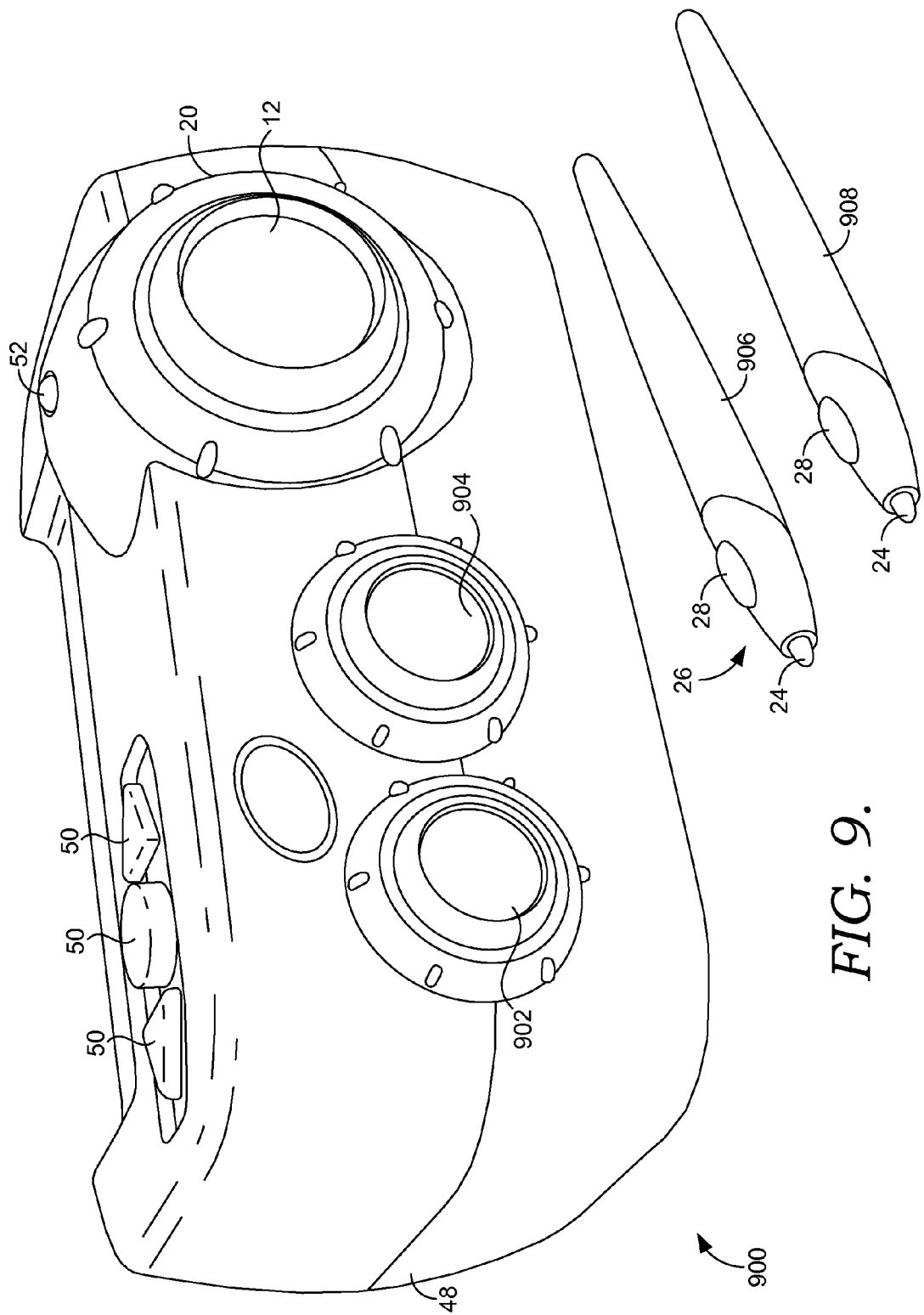
FIG. 9 is perspective drawing depicting an interactive projection unit having two vision sensors and two infrared input devices in accordance with an embodiment of the invention.

Referring now to FIG. 9, a projection unit 900 is described in accordance with another embodiment of the invention. The projection unit 900 includes many of the components described above for the projection system 10. Such components are similarly numbered in FIG. 9 for sake of clarity. The projection unit 900 also comprises a first vision sensor 902, a second vision sensor 904, a first stylus 906, and a second stylus 908. As such, the projection unit 900 is configured to allow two users to provide separate inputs simultaneously.

The first and second vision sensors 902, 904 are identical to the vision sensor 14 described above except that the first and second vision sensors 902, 904 include unique filters (not shown). The first vision sensor 902 includes a light filter that only allows a first predetermined wavelength or range of wavelengths of light to pass therethrough. The second vision filter 904 includes a light filter that only allows a different second predetermined wavelength or range of wavelengths of light to pass therethrough. Thereby, the first and second vision sensors 902, 904 are configured to only detect light that is within their respective predetermined wavelength or range thereof.

The first and second styli 906, 908 are also identical to the stylus 22 described above except that each of the styli 906, 908 is configured to emit light of a different wavelength or range of wavelengths. The first stylus 906 is configured to emit light of the first predetermined wavelength or range of wavelengths and the second stylus 908 is configured to emit light within the second wavelength or range thereof. In an embodiment, the first stylus 906 emits IR light with a wavelength of approximately 850 nanometers and the second stylus 908 emits IR light with a wavelength of approximately 940 nanometers.

Thus, the first vision sensor 902 is configured to only detect light emitted (e.g. inputs) from the first stylus 906 and the second vision sensor 904 is configured to only detect light emitted from the second stylus 908. Thereby, the projection unit 900 can separately track and receive inputs from the two styli 906, 908 simultaneously. In an embodiment, separate tracking of multiple styli as described above provides quicker acquisition of stylus location, better recognition of stylus inputs, and decreases processing time or delay associated with determining a location of the stylus input and determining a corresponding output as compared to other methods in the art such as, embedding signals in the IR emissions to differentiate between styli, among others.

In an embodiment, the projection unit 900 also includes a first processor and a second processor (not shown). The first processor is associated with the first vision sensor 902 and the second processor is associated with the second vision sensor 904 such that each processor may be individually tasked with determining the location of the IR input received by the respective vision sensor 902, 904. One of the first or second processors, or a third processor is provided with the location information and is tasked with the functions required to present an updated projected image.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. An interactive projection system comprising:
a projection unit that projects at least one image onto a projection surface, wherein the projection surface is separate from the interactive projection system;
a first vision sensor configured to sense a location of a first infrared light source;
a first filter associated with the first vision sensor that allows only infrared light of a first predetermined range of wavelengths to contact the first vision sensor;
a second vision sensor configured to sense a location of a second infrared light source;
a second filter associated with the second vision sensor that allows only infrared light of a second predetermined range of wavelengths to contact the second vision sensor, wherein the first and second predetermined ranges of wavelengths are mutually exclusive,
a computing device having one or more processors and a memory that executes a computer application that provides a user interface image that is projected by the projection unit onto the projection surface; and
a first infrared input device that is configured to emit an infrared light upon activation by a user, the infrared light providing input to the computing device via the first vision sensor, the first infrared input device configured to emit infrared light having a wavelength within the first predetermined range, wherein the input provided to the computing device via the first vision sensor is associated with a first type of infrared input signal,
a second infrared input device that is configured to emit an infrared light upon activation by a user, the infrared light providing input to the computing device via the second vision sensor, the second infrared input device configured to emit infrared light having a wavelength within the second predetermined range, wherein the input provided to the computing device via the second vision sensor is associated with a second type of infrared input signal;
wherein the computing device identifies a location of the infrared light with respect to the user interface image projected onto the projection surface and provides a corresponding output;
wherein the corresponding output provided by the computing device in response to infrared light received from the first infrared input device is based at least in part on 1) the identified location of the infrared light input from the first infrared input device with respect to the projected user interface image and 2) the first type of infrared input signal;
wherein the corresponding output provided by the computing device in response to infrared light received from the second infrared input device is based at least in part on 1) the identified location of the infrared light input from the second infrared input device with respect to the projected user interface image and 2) the second type of infrared input signal.

2. The projection system of claim 1, wherein the vision sensor is calibrated to an area inclusive of the user interface image projected onto the projection surface.

3. The projection system of claim 2, wherein the corresponding output includes one or more of updating the user interface image, providing a audible output, and performing an executable task.

4. The projection system of claim 1, further comprising a removable computer memory, the removable computer memory comprising one or more of a universal serial bus (USB) flash drive, a Secure Digital (SD) memory card, a CompactFlash memory card, a Memory Stick, and an xD memory card.

5. The projection system of claim 1, wherein the vision sensor is a complementary metal-oxide-semiconductor (CMOS) sensor with a visible light filter.

6. The projection system of claim 1, wherein an input is received by the projection system from both the first input device and the second input device simultaneously.

7. The projection system of claim 1, wherein the computing device includes at least two processors, wherein a first processor determines the location of the input from the first infrared input device and a second processor determines a location of the input from the second infrared input device.

8. The projection system of claim 1, wherein at least one of the one or more computer applications is a drawing program useable by children to create an artwork.

9. A method for using a projected user interface comprising:
providing a projection system that includes a housing having disposed therein:
(1) a projection unit that projects at least one image onto a projection surface, wherein the projection surface is separate from the projection system;
(2) a first vision sensor capable of sensing a location of a first infrared light source;
(3) a first filter associated with the first vision sensor that allows only infrared light of a first predetermined range of wavelengths to contact the first vision sensor;
(4) a second vision sensor capable of sensing a location of a second infrared light source; and
(5) a computing device having a processor and a memory that executes a software application that provides a user interface image for projection onto the projection surface;
projecting the user interface image onto the projection surface via the projection unit;
providing a first infrared input device that is configured to provide a first infrared input signal upon activation by a user, the first infrared input signal providing input to the computing device via the first vision sensor, wherein the first infrared input device is configured to emit infrared light having a wavelength within the first predetermined range, wherein the input provided to the computing device via the first vision sensor is associated with a first type of infrared input signal;
providing a second infrared input device that is configured to provide a second infrared input signal upon activation by a user, the second infrared input signal providing input to the computing device via the second vision sensor, wherein the second infrared input device is configured to emit infrared light having a wavelength within the second predetermined range, wherein the input provided to the computing device via the second vision sensor is associated with a second type of infrared input signal;
receiving the first infrared input signal from the first infrared input device via the first vision sensor;
determining a location of the received first infrared input signal with respect to the projected user interface image;
determining a type of the received first infrared input signal, wherein the type comprises one or more of a click input, a drag input, a short stationary signal, and a prolonged non-stationary signal;
determining a first input command to the software application based at least in part on the determined location of the received first infrared input signal and the determined type of the received first infrared input signal;
receiving the second infrared input signal from the second infrared input device via the second vision sensor;
determining a location of the received second infrared input signal with respect to the projected user interface image;
determining a type of the received second infrared input signal, wherein the type comprises one or more of a click input, a drag input, a short stationary signal, and a prolonged non-stationary signal;
determining a second input command to the software application based at least in part on the determined location of the received second infrared input signal and the determined type of the received second infrared input signal;
updating the user interface image based on one or more of the first input command and the second input command; and
projecting an updated user interface image.

10. The method of claim 9, wherein at least one of the first infrared input device and the second infrared input device includes one or more of a switch or a button that, when actuated by a user, causes at least one of the first infrared input device and the second infrared input device to emit a corresponding infrared input signal.

11. The method of claim 9, wherein the first infrared input signal from the first infrared input device is reflected off of the projection surface toward the first vision sensor, and further wherein the second infrared input signal from the second infrared input device is reflected off of the projection surface toward the second vision sensor.

12. The method of claim 9, wherein determining at least one of a location of the first infrared input signal with respect to the projected user interface image and a location of the second infrared input signal with respect to the projected user interface image further comprises:
analyzing pixel data collected by at least one of the first vision sensor and the second vision sensor to identify pixels that indicate received infrared light;
filtering one or more of 1) the pixel data received by the first vision sensor to remove data not associated with infrared light emitted by the first infrared input device, and 2) the pixel data received by the second vision sensor to remove data not associated with the infrared light emitted by the second infrared input device;
identifying one or more of 1) a largest grouping of pixels indicating received infrared light from the first infrared input device, and 2) a largest grouping of pixels indicating received infrared light from the second infrared input device;
determining one or more of 1) a central pixel in the largest grouping of pixels indicating received infrared light from the first infrared input device, and 2) a central pixel in the largest grouping of pixels indicating received infrared light from the second infrared input device; and identifying coordinates of at least one of the central pixel corresponding to the first infrared input device and the central pixel corresponding to the second infrared input device, wherein the central pixel corresponding to the first infrared input device is associated with the first input command, and further wherein the central pixel corresponding to the second infrared input device is associated with the second input command.

13. The method of claim 9, further comprising;

projecting a calibration image onto the projection surface, the calibration image including one or more calibration points;

receiving an input from the first infrared input device or the second infrared input device at each of the one or more calibration points;

determining a coordinate location of the received input at each of the one or more calibration points;

mapping the coordinate locations to the calibration image, thereby aligning an output of the projection unit with inputs received by the first vision sensor or the second vision sensor.

14. The method of claim 9, wherein more than one infrared input is received at one time, and wherein each infrared input device emits infrared light of a different wavelength.

15. The method of claim 14, wherein the first vision sensor and the second vision sensor each sense infrared light within a respective, mutually exclusive range of wavelengths of infrared light.

16. An interactive projection system comprising:

a projection unit that projects at least one image onto a projection surface, wherein the projection surface is separate from the interactive projection system;

a first vision sensor configured to sense the location of a first infrared light source, the first vision sensor including a first complementary metal-oxide-semiconductor (CMOS) sensor and a light filter that allows only a first predetermined range of wavelengths of infrared light to reach the CMOS sensor;

a second vision sensor configured to sense the location of a second infrared light source, the second vision sensor including a second CMOS sensor and a second light filter that allows only a second predetermined range of wavelengths of infrared light to reach the second CMOS sensor;

a computing device having a processor and a memory configured to execute one or more applications that provide a user interface image that is projected by the projection unit onto the projection surface;

a first infrared input device that is configured to provide a first input to the computing device by emitting infrared light of a first wavelength within the first predetermined range that is received by the first vision sensor, wherein the input provided to the computing device via the first vision sensor is associated with a location of the first input with respect to the user interface image and a first type of infrared input signal; and a second infrared input device that is configured to provide a second input to the computing device by emitting infrared light of a second wavelength within the second predetermined range that is received by the second vision sensor, wherein the input provided to the computing device via the second vision sensor is associated with a location of the second input with respect to the user interface image and a second type of infrared input signal, wherein the computing device is further configured to execute the one or more applications based on at least one of 1) the location of the first input with respect to the user interface image and the first type of infrared input signal and 2) the location of the second input with respect to the user interface image and the second type of infrared input signal.

17. The interactive projection unit of claim 16, wherein the first infrared input device emits infrared light of a wavelength of approximately 850 nanometers and the second infrared input device emits infrared light of a wavelength of approximately 940 nanometers.

* * * * *